United States Patent [19]

Aubert et al.

[11] 4,344,462
[45] Aug. 17, 1982

[54] FLEXIBLE TUBULAR CONDUIT

[75] Inventors: Jean-Paul Aubert, Puteaux; Maurice Genini, Creteil, both of France

[73] Assignee: COFLEXIP, Puteaux, France

[21] Appl. No.: 152,555

[22] Filed: May 23, 1980

[30] Foreign Application Priority Data

May 30, 1979 [FR] France ............................... 79 13814

[51] Int. Cl.³ ............................ F16L 9/04; F16L 9/18
[52] U.S. Cl. .................................... 138/130; 138/122; 138/129; 138/131; 138/135; 138/138; 138/139; 138/150; 138/154; 138/173
[58] Field of Search .............. 138/118, 121, 122, 123, 138/124, 127, 130, 129, 131, 134, 135, 136, 150, 154, 173, 137-139

[56] References Cited

U.S. PATENT DOCUMENTS

| 571,869 | 11/1896 | Stow .............................. 138/130 X |
| 1,145,434 | 7/1915 | Pechstein .......................... 138/131 |
| 1,785,345 | 12/1930 | Hasemann ...................... 138/134 X |
| 1,806,920 | 5/1931 | See .................................. 138/173 X |
| 2,449,369 | 9/1948 | Doane et al. ....................... 138/121 |
| 3,318,337 | 5/1967 | Bauer ................................ 138/130 |
| 3,581,775 | 6/1971 | Dahl ............................. 138/134 X |
| 3,831,636 | 8/1974 | Bittner ............................... 138/173 |

Primary Examiner—James E. Bryant, III
Attorney, Agent, or Firm—Brisebois & Kruger

[57] ABSTRACT

A flexible conduit has an undulating liquid tight inner tube portion and layers of metal reinforcing wound around the tube. The layers include a burst resisting layer adjacent the tube, then traction and pressure resisting layers, and an outer sheath. The undulations in the interior of the tube can be filled with packing or the tube can be lined with a spiral strip to lessen resistance to fluid flow through the conduit.

8 Claims, 4 Drawing Figures

ROUND OR HALF-ROUND CROSSING STRIPS

ROUND OR HALF-ROUND CROSSING STRIPS

FLEXIBLE TUBULAR CONDUIT

The present invention relates to a flexible tubular conduit, usable principally for the transport of chemical products and hydrocarbons, under conditions of extreme temperatures, in particular in regions where the prevailing temperatures are very low, or in installations such as factories or refineries where the risks of inflammation and fire are very high.

BACKGROUND OF INVENTION

The search for hydrocarbons tends to extend more and more into areas not previously exploited because of severe climatic conditions. Thus, in particular, the search for petroleum and its production is actually done in artic regions where the prevailing temperatures are often several tens of degrees below zero. Currently used for transport of hydrocarbons is rigid steel pipe generally made up of sections welded together on the site. The manufacture of such pipelines and their use in such areas presents serious problems because of the extent of expansion of the pipes and the deformations of the terrain under the effects of extreme variations in temperature and alternate freezing and thawing.

Thus the development of transport for liquefied natural gas presents a problem for pipelines and their connection with charging/discharging systems which must resist temperatures of −160° C. while still allowing movement between mobile elements.

SUMMARY OF INVENTION

The present invention proposes, by way of a new industrial product, to provide a flexible tubular conduit or pipe, which can be made in large diameters and long lengths, or in sections, having a high resistance to longitudinal traction forces, resistance to high pressures, especially in a range of between 75 and 140 bars, and usable in a very wide range of temperatures which can go from −160° C. to +500° C.

The object of the present invention is a flexible tubular pipe or conduit of the type having an internal undulating or corrugated metallic tube and an external metallic protective covering made of a hooked or interlocked strip, characterized by the fact that the conduit has around the corrugated tube, an inner covering of at least one metallic layer to provide resistance to brusting and a sheathing or armor insuring resistance to traction and to the effect of internal head pressure, the said sheathing being constituted of at least two crossed superposed layers of metallic strips, particularly of rectangular section, helically wound in opposite directions, the angle of winding of the strips with respect to the axis of the pipe advantageously being on the order of 35°.

In a first embodiment of the invention, the inner layer to provide resistance to bursting comprises a casing made of metallic interhooked S-shaped strips preferably wound with a pitch in a direction opposite to the helical undulations of the internal undulating tube. Thus, for example, if the angle of the helical undulations of the undulating tube with respect to the axis of the pipe is on the order of 85°, the angle of winding of the turns of the casing to provide resistance to bursting will be about 85°.

In a second embodiment, the resistance to bursting is obtained by means of at least two crossed superposed layers of metallic strip or wire hooping, especially round or half-round strip in section. The angle of winding of the hooping strips or wires with respect to the axis of the pipe, is preferably on the order of 55°, the strips of the two layers preferably being wound with opposite pitch.

In order to improve the condition of the internal surface and to reduce pressure losses in the pipe, it is useful to coat or face the interior of the undulating tube. In a first embodiment, this facing comprises a flat spiral metallic plating welded so as to form scales.

In a second embodiment, this coating may be formed by filling the internal undulations with a packing material which adheres to the steel and resists low temperatures, for example, −160° C.

It is equally useful for certain applications such as, for example, the transfer of liquefied gas at cryogenic temperatures or for flexible pipes which must be resistant to fire or transport superheated vapors, to place between certain of the layers constituting the pipe according to the invention, insulating material such as, for example, glass, asbestos, or ceramic fibers.

It is also useful in these applications and in others, such as the transport of liquefied natural gas, to provide heating elements, such as electrical resistances between the traction sheathing layer and the external protection layer to avoid the effects of freezing on the external layer.

Other advantages and characteristics of the invention will appear on reading the following non-limiting description, given by way of example.

DETAILED DESCRIPTION

Figure 1:
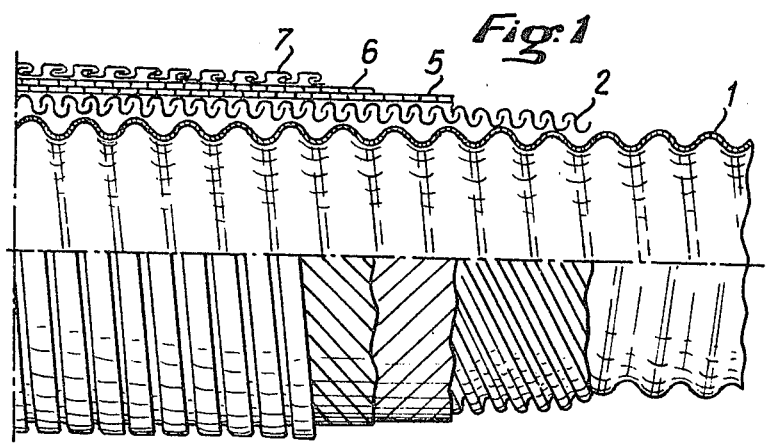
FIG. 1 shows partially stripped away and partially in section, a first embodiment of the flexible tubular pipe or conduit according to the invention.

Referring to the drawings, it will be seen that the flexible tubular pipe according to the invention includes a metallic internal undulating tube 1, made for example of stainless steel.

Resistance to bursting of the pipe is insured in the embodiment of FIG. 1 by a casing formed of interhooked metallic strips 2 made in the shape of an S, the pitch of winding of the shaped strips preferably being in a direction opposite to that of the undulations of internal undulating tube 1.

Figure 2:
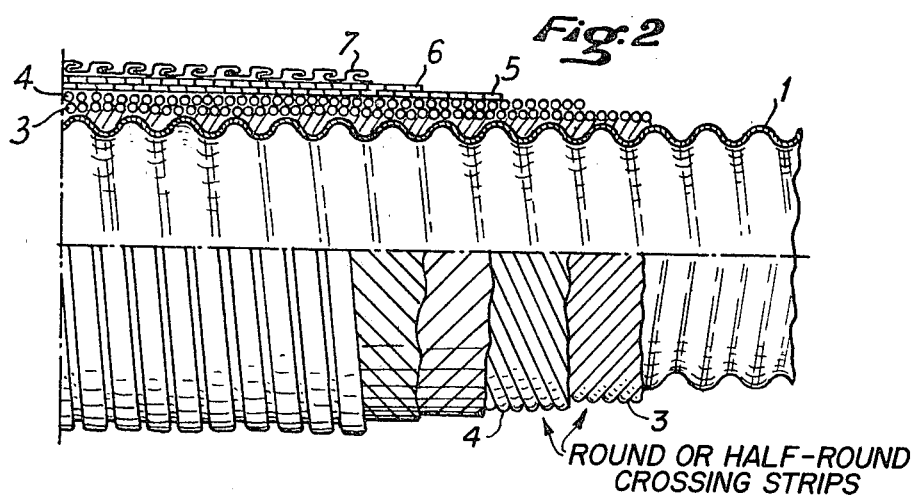
FIG. 2 shows, in a manner corresponding to FIG. 1, a second embodiment of the flexible tubular pipe according to the invention.

In the embodiment of FIG. 2, resistance to bursting is insured by at least two superposed layers 3 and 4 of metallic hooping strips, particularly round or half-round in section, the strips of the two layers 3 and 4 being wound in opposite directions, i.e. with opposite pitch.

To insure resistance to traction and to the effect of head pressure inside the pipe, there are at least two crossed superposed layers, 5 and 6, of metallic strips, particularly rectangular in section, wound in opposite directions.

Finally, the flexible pipe according to the invention has an external metallic layer 7, made of a hooked sheathing, with a section basically in the shape of an S or a Z.

Figure 4:
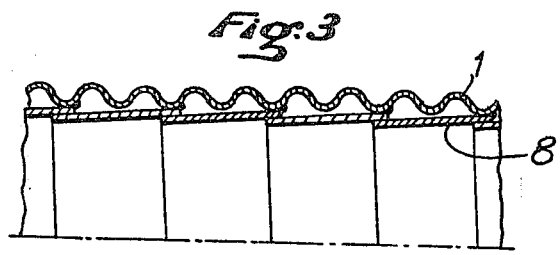
FIGS. 3 and 4 show respectively, different surface arrangements for the interior of the pipe.
Figure 3:
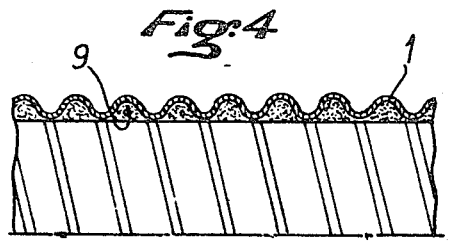

FIGS. 3 and 4 show arrangements for reducing the internal roughness of the tube 1 of the pipe.

Thus, in FIG. 3, inside the undulating metallic tube 1 there is a covering made of a flat spiral metallic sheathing welded so as to form scales 8.

In the embodiment of FIG. 4, the inside covering consists of a packing material 9 filling the undulations of undulating tube 1. Suitable packing materials 9 are fluorinated resins or elastomers.

Although the invention has been described in connection with particular embodiments, it is of course evident that it is in no way limited thereby and may undergo numerous modifications without exceeding either its scope or its spirit.

What is claimed is:

1. A flexible tubular conduit comprising an internal metallic undulating tube and an external metallic protection covering of interlocked strip, characterized by the fact that around said undulating tube is an interior covering of at least one metallic layer to provide resistance to bursting, and a sheath resistant to traction and to the effect of internal head pressure, said sheathing comprising at least two crossing superposed layers of metallic strips wound with opposite pitch, respectively.

2. A conduit according to claim 1 wherein said crossing superposed metallic strips each comprise flat strips of rectangular section.

3. A conduit according to claim 1, wherein the layer to provide resistance to bursting comprises a casing of interhooked S-shaped metallic strip wound to have a pitch opposite to a pitch of the undulations of the internal undulating tube.

4. A conduit according to claim 1, wherein resistance to bursting is insured by means of at least two crossing superposed layers of metallic hooping strips, the strips of the two layers being wound in opposite directions.

5. A conduit according to claim 4, wherein said crossing strips are circular in section.

6. A conduit according to claim 4, wherein said crossing strips are of half-round section.

7. A conduit according to any one of the preceding claims, characterized by the fact that an inside facing of the internal undulating tube comprises a welded flat spiral metallic strip.

8. A conduit according to any one of claims 1 to 6, wherein an inside facing of the internal undulating tube comprises a packing material resistant to low temperatures filling the undulations of the interior of said undulating tube.

* * * * *